(12) United States Patent
Duoss et al.

(10) Patent No.: US 10,003,059 B2
(45) Date of Patent: Jun. 19, 2018

(54) ION CONDUCTIVE INKS AND SOLUTIONS FOR ADDITIVE MANUFACTURING OF LITHIUM MICROBATTERIES

(71) Applicant: LAWRENCE LIVERMORE NATIONAL SECURITY, LLC, Livermore, CA (US)

(72) Inventors: Eric B. Duoss, Dublin, CA (US); Patrick G. Campbell, Oakland, CA (US); William C. Floyd, III, Oakland, CA (US); Julie A. Jackson, Livermore, CA (US); Matthew Merrill, Dublin, CA (US); Conner T. Sharpe, Tracy, CA (US); Christopher M. Spadaccini, Oakland, CA (US); Michael Stadermann, Pleasanton, CA (US); Cheng Zhu, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 216 days.

(21) Appl. No.: 14/882,127

(22) Filed: Oct. 13, 2015

(65) Prior Publication Data

US 2017/0104198 A1    Apr. 13, 2017

(51) Int. Cl.

| | | |
|---|---|---|
| *H01M 2/16* | (2006.01) | |
| *H01M 10/05* | (2010.01) | |
| *H01M 10/0525* | (2010.01) | |
| *C09D 11/00* | (2014.01) | |
| *H01M 2/14* | (2006.01) | |
| *H01M 2/18* | (2006.01) | |
| *H01M 10/04* | (2006.01) | |
| *H01M 6/40* | (2006.01) | |

(52) U.S. Cl.
CPC ........... *H01M 2/1653* (2013.01); *C09D 11/00* (2013.01); *H01M 2/145* (2013.01); *H01M 2/1673* (2013.01); *H01M 2/18* (2013.01); *H01M 6/40* (2013.01); *H01M 10/0436* (2013.01); *H01M 10/0525* (2013.01); *H01M 2220/30* (2013.01)

(58) Field of Classification Search
None
See application file for complete search history.

(56) References Cited

U.S. PATENT DOCUMENTS

| | | |
|---|---|---|
| 4,575,330 A | 3/1986 | Hull |
| 7,088,432 B2 | 8/2006 | Zhang |

(Continued)

FOREIGN PATENT DOCUMENTS

WO    2014182535    11/2014

OTHER PUBLICATIONS

Delannoy et al., "Toward Fast and Cost-Effective Ink-Jet Printing of Solid Electrolyte for Lithium Microbatteries," Journal of Power Sources, 274, 2015, pp. 1085-1090.

(Continued)

*Primary Examiner* — Sarah A. Slifka
*Assistant Examiner* — Haroon S. Sheikh
(74) *Attorney, Agent, or Firm* — Eddie E. Scott

(57) ABSTRACT

A separator made of ion conductive ink is produced by additive manufacturing. A micro-battery is produced with the separator made of ion conductive ink located between the battery's anode and cathode. The separator functions to keep the anode and cathode apart and to facilitate the transport of ions to produce an operative micro-battery.

8 Claims, 11 Drawing Sheets

(56) References Cited

U.S. PATENT DOCUMENTS

| | | | |
|---|---|---|---|
| 7,968,233 B2 | 6/2011 | Nelson et al. | |
| 2005/0239917 A1 | 10/2005 | Nelson et al. | |
| 2009/0130380 A1* | 5/2009 | Asakawa | B82Y 10/00 |
| | | | 428/116 |
| 2013/0011735 A1 | 1/2013 | Nelson et al. | |
| 2014/0072881 A1* | 3/2014 | Park | H01M 10/0565 |
| | | | 429/303 |
| 2014/0308574 A1* | 10/2014 | Ensling | H01M 2/1673 |
| | | | 429/164 |

OTHER PUBLICATIONS

Ferrari et al., "Latest Advances in the Manufacturing of 3D Rechargeable Lithium Microbatteries," Journal of Power Sources, 286, 2015, pp. 25-46.

Liu et al., "Ionic Conductivity Enhancement of Polymer Electrolytes with Ceramic Nanowire Fillers," ACS Publications, Nano Lett., 2015, pp. 2740-2745.

Ollinger et al., "Laser Direct-Write of Polymer Nanocomposites," JLMN—Journal of Laser Micro/Nanoengineering, vol. 1, No. 2, 2006, pp. 102-105.

Spadaccini et al., "Additive Manufacturing Techniques Deliver Three-Dimensional Microstructures with Previously Unobtainable Material Properties," Materials by Design, S&TR, 2012, pp. 14-20.

Sun et al., "3D Printing of Interdigitated Li-Ion Microbattery Architectures," Adv. Mater., 2013, pp. 4539-4543.

* cited by examiner

ION CONDUCTIVE INKS AND SOLUTIONS FOR ADDITIVE MANUFACTURING OF LITHIUM MICROBATTERIES

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to additive manufacturing of lithium microbatteries.

State of Technology

This section provides background information related to the present disclosure which is not necessarily prior art.

The article, "Material by Design," Science and Technology Review, March 2012, provides the state of technology information reproduced below.

"From the Bottom Up

Additive manufacturing is the process of building 3D structures by sequentially layering one material on top of another in a desired pattern. It is a dramatic departure from more conventional fabrication techniques in which material is removed from a bulk piece through processes such as etching or machining. Contrary to what the name might imply, additive manufacturing actually requires less material than "subtractive" fabrication methods. It also results in less waste and can reduce manufacturing costs.

Over the last decade, additive manufacturing has become a burgeoning industry, enabling rapid prototyping of components for automotive, medical, and electronic applications. News headlines in recent years have showcased the often-remarkable capabilities of 3D printers that produce macroscale objects, such as a prototype musical instrument. Although specialized technologies are available for developing 3D structures with small, mesoscale (millimeter-length) features—hearing aids, for example—they are limited to a small number of materials as well as component size and shape specifications.

Building Complex Structures

Projection microstereolithography, direct ink writing, and electrophoretic deposition offer a unique combination of advantages for fabricating microscale structures from multiple materials. "These three technologies complement each other," says Kuntz. "Where one is weaker in a certain capability, the others are strong."

Projection microstereolithography, for example, can reliably create structures in three dimensions, but for now, it is compatible with only a few materials. Direct ink writing and electrophoretic deposition, on the other hand, work well with more materials but do not offer the same 3D capability as projection microstereolithography. Electrophoretic deposition would have to burn out excess, or fugitive, material within a fabricated component to create void space, but direct ink writing and projection microstereolithography can build these spaces where needed during component fabrication. Says Kuntz, "By combining the techniques, we can create more complex structures than we can produce using one method alone."

With each fabrication approach, the team first applies a computer-aided design program to section an image of the desired structure into 2D slices in the horizontal plane. In a project with MIT professor Nicholas Fang and his colleague Howon Lee, the team used projection microstereolithography to display 2D images on a digital photomask made from a micromirror or liquid crystal on a silicon chip. An ultraviolet light-emitting diode illuminates the miniature display, which reflects light and an image of the component to be fabricated through a series of reduction optics onto a photopolymer liquid resin. As the resin cures, it hardens into the shape of the image. The substrate holding the resin is then lowered using a motion-controlled stage, and the next 2D slice is processed.

Projection microstereolithography is a high-speed parallel process that can fabricate structures at both micro- and macroscales within minutes. "Using projection microstereolithography, we can rapidly generate materials with complex 3D microscale geometries," says Spadaccini, the principal investigator for the technique.

However, the method does have its limitations. "The quality of a component depends on the uniformity of light at the image or polymerization plane and both the lateral and depth resolution of the system," he says. "Resolution is restricted both by the optical resolution and the physical-chemical characteristics of the exposed monomer solution."

Inking a Material

The direct ink-writing process can also create micro- to macroscale structures with extreme precision. With this technique, a print head mounted to a computer-controlled translation stage deposits inks into programmed designs on various substrates. The process works layer by layer, adding a continuous filament to a substrate. The patterns it generates range from simple, one-dimensional wires to complex, 3D structures.

Inks are administered through one or more nozzles, and filament diameter is determined by nozzle size, print speed, and rates of ink flow and solidification. The time required to build a final part is determined by the distance from the nozzle to the substrate and by print speed. The finest feature size obtained with this technology is approximately 200 nanometers—smaller than the features produced with projection microstereolithography. Recently, the team constructed two direct ink-writing platforms that can travel 30 centimeters at up to 10 centimeters per second while maintaining micrometer and submicrometer resolution.

Direct ink writing can rapidly pattern different materials into multiscale, multidimensional structures for an array of applications. However, process improvements, including more sophisticated inks, are needed to achieve the arbitrary, complex 3D structures required for designer materials. To date, the researchers have designed particle- and nonparticle-based inks derived from metals, ceramics, and polymers."

U.S. Pat. No. 4,575,330 to Charles W. Hull for apparatus for production of three-dimensional objects by stereolithography issued May 11, 1986 provides the state of technology information reproduced below.

"It is common practice in the production of plastic parts and the like to first design such a part and then painstakingly produce a prototype of the part, all involving considerable time, effort and expense. The design is then reviewed and, oftentimes, the laborious process is again and again repeated until the design has been optimized. After design optimization, the next step is production. Most production plastic parts are injection molded. Since the design time and tooling costs are very high, plastic parts are usually only practical in high volume production. While other processes are available for the production of plastic parts, including direct machine work, vacuum-forming and direct forming, such methods are typically only cost effective for short run production, and the parts produced are usually inferior in quality to molded parts.

In recent years, very sophisticated techniques have been developed for generating three-dimensional objects within a fluid medium which is selectively cured by beams of radiation brought to selective focus at prescribed intersection points within the three-dimensional volume of the fluid medium. Typical of such three-dimensional systems are those described in U.S. Pat. Nos. 4,041,476; 4,078,229; 4,238,840 and 4,288,861. All of these systems rely upon the buildup of synergistic energization at selected points deep within the fluid volume, to the exclusion of all other points in the fluid volume, using a variety of elaborate multibeam techniques. In this regard, the various approaches described in the prior art include the use of a pair of electromagnetic radiation beams directed to intersect at specified coordinates, wherein the various beams may be of the same or differing wavelengths, or where beams are used sequentially to intersect the same points rather than simultaneously, but in all cases only the beam intersection points are stimulated to sufficient energy levels to accomplish the necessary curing process for forming a three-dimensional object within the volume of the fluid medium. Unfortunately, however, such three-dimensional forming systems face a number of problems with regard to resolution and exposure control. The loss of radiation intensity and image forming resolution of the focused spots as the intersections move deeper into the fluid medium create rather obvious complex control situations. Absorption, diffusion, dispersion and defraction all contribute to the difficulties of working deep within the fluid medium on any economical and reliable basis.

Yet there continues to be a long existing need in the design and production arts for the capability of rapidly and reliably moving from the design stage to the prototype stage and to ultimate production, particularly moving directly from computer designs for such plastic parts to virtually immediate prototypes and the facility for large scale production on an economical and automatic basis.

Accordingly, those concerned with the development and production of three-dimensional plastic objects and the like have long recognized the desirability for further improvement in more rapid, reliable, economical and automatic means which would facilitate quickly moving from a design stage to the prototype stage and to production, while avoiding the complicated focusing, alignment and exposure problems of the prior art three dimensional production systems."

U.S. Pat. No. 8,591,602 to Messaoud Bedjaoui for a lithium microbattery comprising an encapsulating layer and fabrication method issued Nov. 26, 2013 provides the state of technology information reproduced below.

Microbatteries, also called "all solid-state batteries", find numerous industrial applications in particular in the field of microelectronics wherein component miniaturization and autonomy requirements impose the use of increasingly small, more powerful storage batteries with longer lifetimes. Microbatteries come in the form of a stack of solid thin layers successively deposited on a substrate by conventional techniques of the microelectronics industry in particular by physical vapor deposition (PVD), chemical vapor deposition (CVD) and lithography techniques.

Lithium microbatteries are particularly interesting on account of their high mass density, their high effective surface of energy storage and their low toxicity. Nevertheless, these lithium microbatteries are very sensitive to air and in particular to moisture. In the presence of water or oxygen, the lithium negative electrode oxidizes to respectively give lithium hydroxide (LiOH) or lithium oxide (Li.sub.2O). This phenomenon in the long run leads to a loss of the microbattery performances. To remedy this shortcoming, the microbattery is generally covered with an impermeable coating, compatible with the microbattery components, which encapsulates the lithium microbattery and thereby forms a barrier against contaminants. The commonly used barrier layers are polymer, ceramic or metal layers.

Other shortcomings also limit the use of these microbatteries in microelectronics or affect their performances. The thermal instability of lithium at high temperature is a particularly limiting point for integration of lithium microbatteries in microelectronic devices.

Finally, operation of the lithium microbattery being based on transportation of the current by the lithium ions, when the microbattery is charged and discharged, the electrodes undergo deformations due to insertion and extraction, also called de-insertion, of the lithium ions in the electrodes. These repeated modifications of volume rapidly cause mechanical damage, in particular losses of contact between the negative electrode and the corresponding current collector.

The article "Ionic Conductivity Enhancement of Polymer Electrolytes with Ceramic Nanowire Fillers," by Wei Liu, Nian Liu, Jie Sun, Po-Chun Hsu, Yuzhang Li, Hyun-Wook Lee, and Yi Cui, *Nano Lett.*, 2015, 15 (4), pp 2740-2745, Mar. 17, 2015, provides the state of technology information reproduce below.

Solid-state electrolytes provide substantial improvements to safety and electrochemical stability in lithium-ion batteries when compared with conventional liquid electrolytes, which makes them a promising alternative technology for next-generation high-energy batteries. Currently, the low mobility of lithium ions in solid electrolytes limits their practical application. The ongoing research over the past few decades on dispersing of ceramic nanoparticles into polymer matrix has been proved effective to enhance ionic conductivity although it is challenging to form the efficiency networks of ionic conduction with nanoparticles. In this work, we first report that ceramic nanowire fillers can facilitate formation of such ionic conduction networks in polymer-based solid electrolyte to enhance its ionic conductivity by three orders of magnitude. Polyacrylonitrile-LiClO$_4$ incorporated with 15 wt % Li$_{0.33}$La$_{0.557}$TiO$_3$ nanowire composite electrolyte exhibits an unprecedented ionic conductivity of $2.4 \times 10^{-4}$ S cm$^{-1}$ at room temperature, which is attributed to the fast ion transport on the surfaces of ceramic nanowires acting as conductive network in the polymer matrix. In addition, the ceramic-nanowire filled composite polymer electrolyte shows an enlarged electrochemical stability window in comparison to the one without fillers. The discovery in the present work paves the way for the design of solid ion electrolytes with superior performance.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods provide a micro-battery and a system for producing a micro-battery by additive manufacturing using ion conductive ink. A separator made of ion conductive ink is produced by additive manufacturing. The micro-battery is produced with the separator located between the battery's anode and cathode. The separator functions to keep the anode and cathode apart and to allow the transport of ions to produce an operative micro-battery. In one embodiment the separator is made ion conductive ink that provides greater mechanical, thermal, and electrochemical stability over prior art liquid electrolytes. In one embodiment the ion conductive ink is made by the addition of Li Salt (Lithium Bis(trifluoromethane)sulfonimide, LiTFSI) and tetraglyme (TG) solvent to a photocurable polymer resin such as polyethylene glycol diacrylate (PEGDA) or hexanediol diacrylate (HDDA). In another embodiment the ion conductive ink is made by adding methacrylpropylsulfate (MPS) salts to PEGDA that introduces tethered anions to the polymer.

In the inventor's apparatus, systems, and methods, a micro-scale design of a three-dimensional micro-battery is provided where the anode, cathode, separator/electrolyte, and current collector are patterned into highly interpenetrating but discrete phases that have high surface areas and small transport distances while maximizing the amount of active material (i.e., anode or cathode) that can be packed into a given volume. The inventor's design has greater areal, volumetric, or gravimetric power density (or energy density) for a given energy density (or power density) compared to conventional designs based on planar layouts (e.g., flat plates, jelly rolls, etc.), or interdigitated geometries (e.g., combs, posts). As a result, for a given power load, this design can be used to manufacture micro-batteries that last longer (store more energy) on a single charge for applications requiring portable power sources (e.g., mobile phones and other portable electronic devices) for a given rate or can be charged or discharged faster for a given energy than prior art batteries. This can yield lighter or smaller batteries for applications where weight is a factor.

In one embodiment of the inventor's apparatus, system, and method a model of a separator made of ion conductive ink is created. The model is designed using computer aided design (CAD) software or other systems for creating a digital model. The model is used in an additive manufacturing system to produce a separator made of ion conductive ink. The ion conductive ink separator includes a network of anode micro-channels and a network of cathode micro-channels. The network of anode micro-channels and the network of cathode micro-channels are interwoven and closely spaced to provide an interpenetrating network of anode micro-channels and cathode micro-channels. The matrix of anode micro-channels and the matrix of anode micro-channels do not interconnect but instead form self-contained matrices. The ion conductive ink separator network of anode micro-channels are filled with an anode material and the network of cathode micro-channels are filled with a cathode material. Electrodes are connected to the anode and cathode. A casing is added to complete the micro-battery.

The disclosed apparatus, systems, and methods have use in lithium ion batteries, printable batteries, printable separators, ion conductive inks, mobile phones, laptops, electric and hybrid vehicles, mobile telecom equipment, and portable electronics for military applications.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
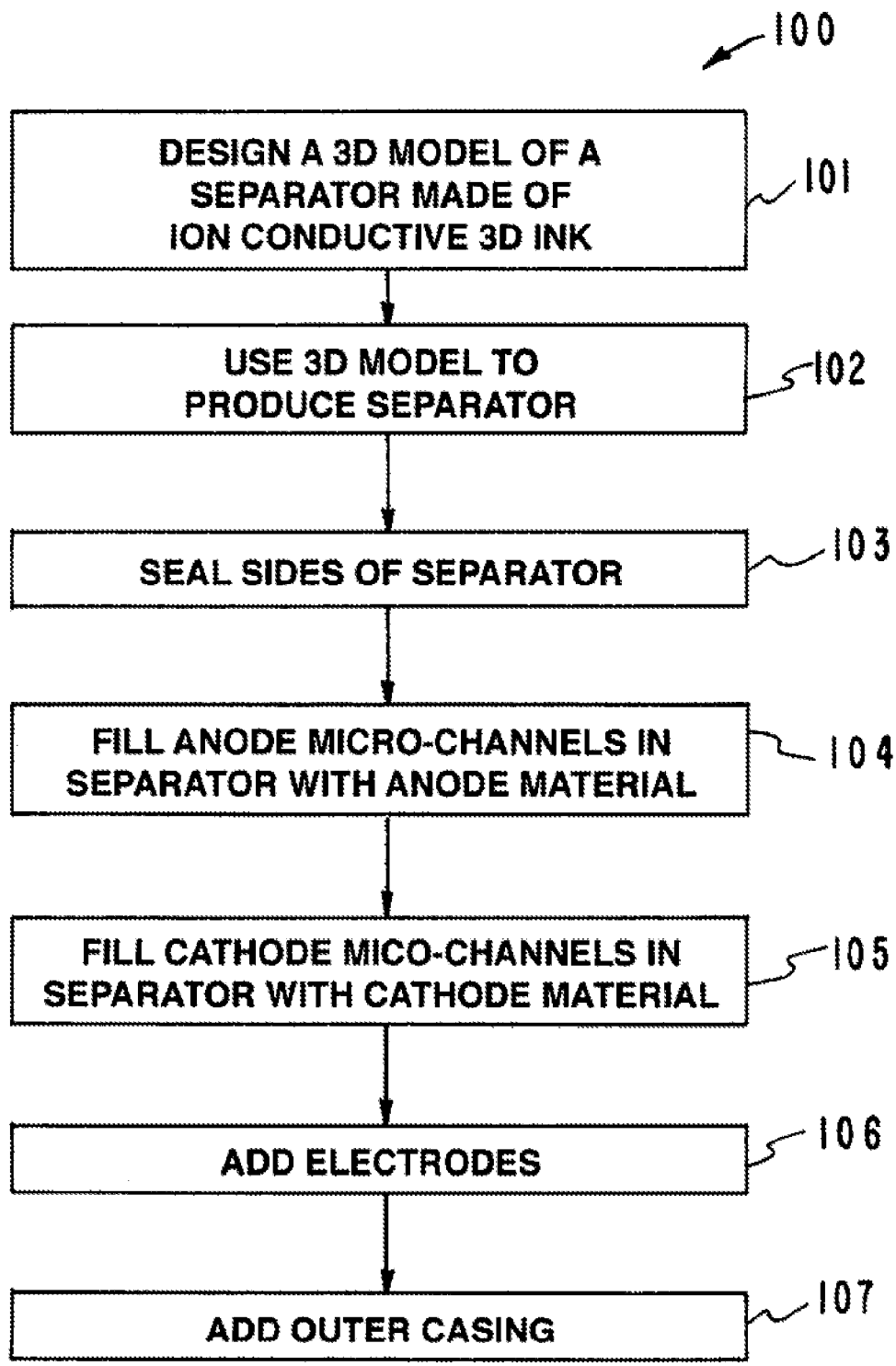
FIG. 1 is a flow chart that illustrates one embodiment of the inventor's apparatus, systems, and methods for producing a lithium micro-battery.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

In the inventor's apparatus, systems, and methods, a micro-scale design of a three-dimensional micro-battery is provided where the anode, cathode, separator/electrolyte, and current collector are patterned into highly interpenetrating but discrete phases that have high surface areas and small transport distances while maximizing the amount of active material (i.e., anode or cathode) that can be packed into a given volume. The inventor's micro-battery has greater areal, volumetric, or gravimetric power density (or energy density) for a given energy density (or power density) compared to conventional designs based on planar layouts (e.g., flat plates, jelly rolls, etc.), or interdigitated geometries (e.g., combs, posts). As a result, for a given power load, the inventor's micro-battery will last longer (store more energy) on a single charge for applications requiring portable power sources (e.g., mobile phones and other portable electronic devices) for a given rate or can be charged or discharged faster for a given energy than prior art batteries. This can yield lighter or smaller batteries for applications where weight is a factor.

In one embodiment of the inventor's apparatus, system, and method a model of a separator made of ion conductive ink is created. The model is designed using computer aided design (CAD) software or other systems for creating a digital model. The model is used in an additive manufacturing system to produce a separator made of ion conductive ink. The ion conductive ink separator includes a network of anode micro-channels and a network of cathode micro-channels. The network of anode micro-channels and the network of cathode micro-channels are interwoven and closely spaced to provide an interpenetrating network of anode micro-channels and cathode micro-channels. The matrix of anode micro-channels and the matrix of anode micro-channels do not interconnect but instead form self-contained matrices. The ion conductive ink separator network of anode micro-channels are filled with an anode material and the network of cathode micro-channels are filled with a cathode material. Electrodes are connected to the anode and cathode. A casing is added to complete the micro-battery.

Referring now to FIG. 1, a flow chart illustrates one embodiment of the inventor's apparatus, systems, and methods for producing a lithium micro-battery. The flow chart is designated generally by the reference numeral 100. As illustrated in the flow chart 100, the system includes a number of steps. The steps in FIG. 1 are identified and described below.

Step 1—DESIGN A 3D MODEL OF SEPARATOR MADE OF ION CONDUCTIVE 3D INK (Reference Numeral 101)—In step 1 a model of the separator made of ion conductive ink is created. The model is designed using computer aided design (CAD) software or other systems for creating a digital model.

Step 2—USE 3D MODEL TO PRODUCE SEPARATOR (Reference Numeral 102)—In step 2 the model is used to produce a separator. In this embodiment the separator is produce by Projection Micro-StereoLithography (PμSL).

Step 3—SEAL SIDES OF SEPARATOR (Reference Numeral 103)—In step 3 the sides of the separator are sealed.

Step 4—FILL ANODE MICRO-CHANNELS IN SEPARATOR WITH 3D ANODE INK (Reference Numeral 104)—In step 4 the anode micro-channels in the separator are filled with anode ink.

Step 5—FILL CATHODE MICRO-CHANNELS IN SEPARATOR WITH 3D CATHODE INK (Reference Numeral 105)—In step 5 the cathode micro-channels in the separator are filled with anode ink.

Step 6—ADD ELECTRODES (Reference Numeral 106)—In step 6 electrodes are added.

Step 7—ADD OUTER CASING (Reference Numeral 107)—In step 7 an outer casing is added.

This embodiment of the inventor's disclosed apparatus, systems, and methods 100 provide a lithium battery with a separator made of ion conductive ink. The separator made of ion conductive ink includes a network of anode micro-channels that are filled with an anode material and a network of cathode micro-channels that are filled with a cathode material. The network of anode micro-channels and the network of cathode micro-channels are interwoven and closely spaced to provide are interwoven to provide an interpenetrating network of anode and cathode materials. The matrix of anode micro-channels and the matrix of anode micro-channels do not interconnect but instead form self-contained matrices for the anode and cathode materials.

The separator made of ion conductive ink is produce by Projection Micro-StereoLithography (PμSL). The first step in creating the separator by PμSL is to design the separator. Modeling is used to design the separator. In different embodiments the modeling includes computer simulation, computer aided design and other modeling techniques.

Figure 2:
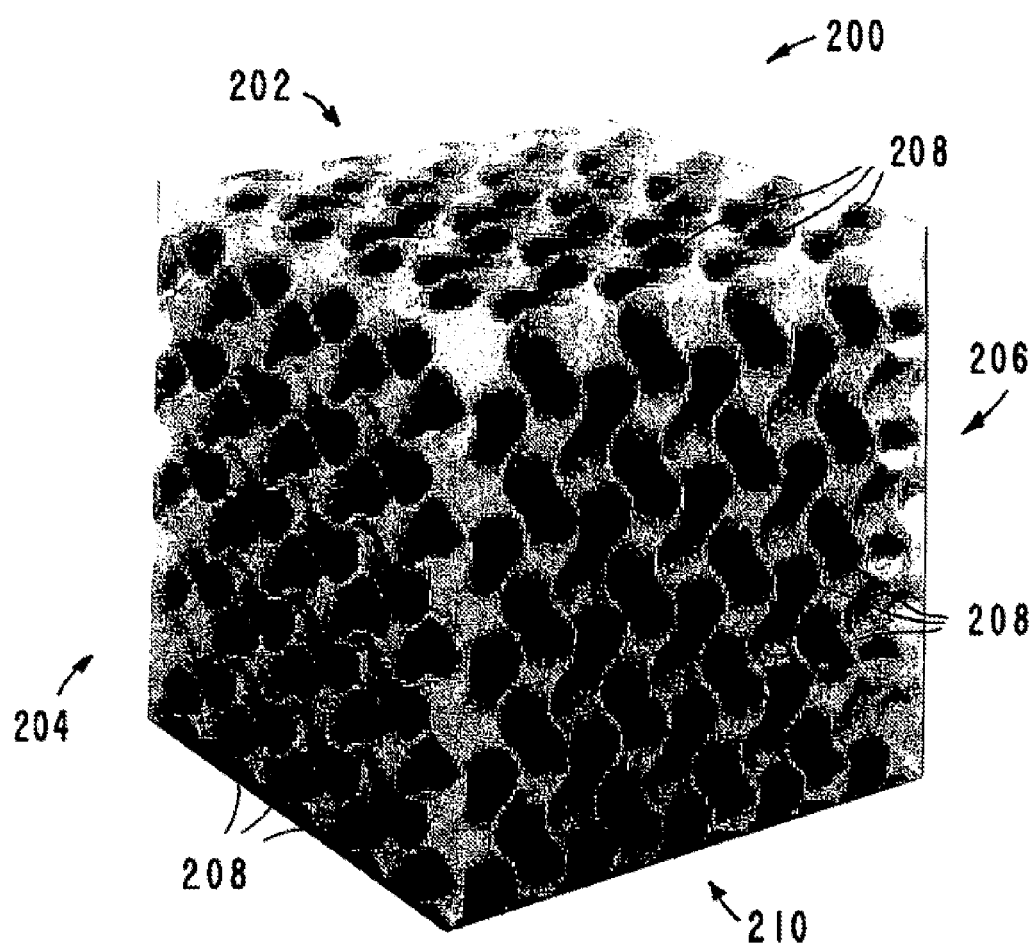
FIG. 2 illustrates one embodiment of the model of the inventor's separator.

Referring now to FIG. 2, one embodiment of the model of the inventor's separator is illustrated. The model is designated generally by the reference numeral 200. The model 200 shown in FIG. 2 illustrates a model for the construction of a micro-battery separator made of ion conductive ink. The model 200 is one embodiment of the model illustrated and describe in the flow chart of FIG. 1 under the heading "Step 1." The model 200 is designed using computer aided design (CAD) software or other systems for creating a digital model.

The model 200 will be used to build a micro-battery separator made of ion conductive ink. The micro-battery separator will have the shape of an interpenetrating, three-dimensional structure, with greater areal, volumetric, and gravimetric power density compared to conventional battery separator designs based on planar layouts (e.g., flat plates, jelly rolls, etc.), or interdigitated geometries (e.g., combs, posts). The model 200 shown in FIG. 2 has a gyroid shape with a matrix of anode micro-channels and a matrix of anode micro-channels that are interwoven to provide an interpenetrating network of anode and cathode materials. The model 200 having a gyroid shape provides high surface areas and small transport distances while maximizing the amount of active anode and cathode materials.

The three dimensional model 200 has a top surface 202, four side surfaces of which side surfaces 204 and 206 can be seen in FIG. 2, and a bottom surface that cannot be seen in FIG. 2 but is designated by the arrow 210. Openings 208 are illustrated in the model 200. The openings 208 represent opening for a matrix of anode micro-channels and a matrix of anode micro-channels that are interwoven to provide an interpenetrating network of anode and cathode materials. The matrix of anode micro-channels and the matrix of anode micro-channels do not interconnect but instead form self-contained matrices for the anode and cathode materials.

The matrix of anode micro-channels extends from the top surface 202 into the body of the model 200 but do not extend to the bottom surface 210. The matrix of anode micro-channels extend to the four side surfaces of which side surfaces 204 and 206 can be seen in FIG. 2; however, the four side surfaces will be sealed in further processing steps and the anode micro-channels blocked at the side surfaces.

The matrix of cathode micro-channels extends from the bottom surface 210 into the body of the model 200 but do not extend to the top surface 202. The matrix of cathode micro-channels extend to the four side surfaces of which side surfaces 204 and 206 can be seen in FIG. 2; however, the four side surfaces will be sealed in further processing steps and the cathode micro-channels blocked at the side surfaces.

Projection Micro-StereoLithography (PμSL)

Figure 3:
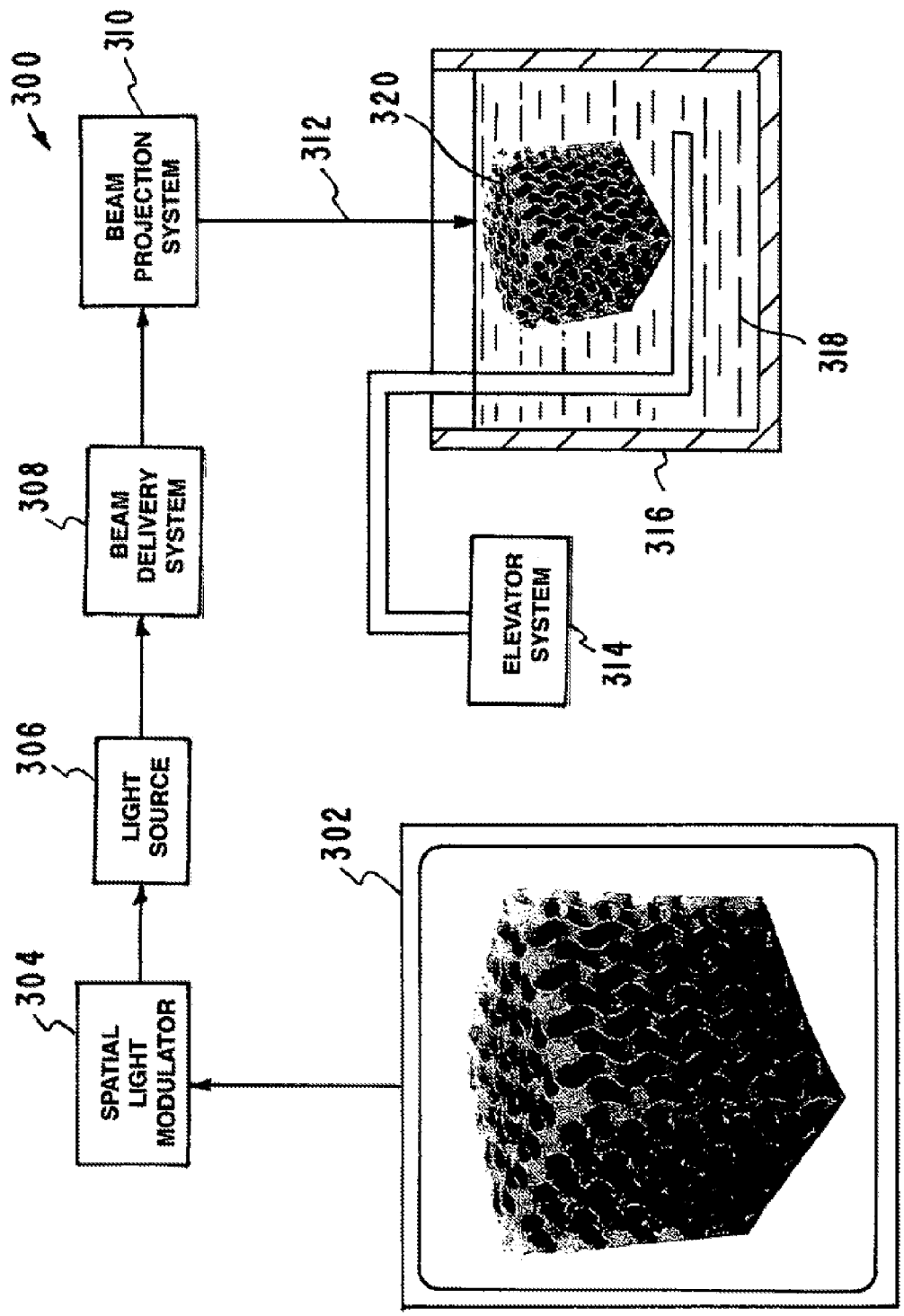
FIG. 3 is an illustrative flow diagram of a Projection Micro-StereoLithography (PμSL) system used to make an embodiment the inventor's separator made of ion conductive ink.

FIG. 3 provides an illustrative flow diagram of the Projection Micro-StereoLithography (PμSL) system 300 to make the inventor's separator made of ion conductive ink. The flow diagram is designated generally by the reference numeral 300. The flow diagram 300 is described below.

The computer generated image 302 is designed using computer aided design (CAD) software. The 3-D CAD model is virtually sliced into a series of 2-dimensional data files via software. The files are 2D layers, each defining a planar cross section through the product to be constructed.

A digital image is projected using a Lcos chip 304. The digital image projection 304 produces a UV beam 306 containing the digital image of the first 2D layer. The UV beam 306 containing the digital image of the first 2D layer is sent to an adjustable beam delivery system 308. The beam delivery system 306 sends the image to a beam projection system 310. The beam projection system 310 directs and projects the first slice image to create the first slice. The first slice is lowered 312 into a curable ink resin bath 318 in container 316 to produce a curable ink resin layer on the first slice. An elevator system 314 is used to lower and raise the individual slices into and out of the resin bath 318. The steps are repeated resulting in the beam projection system 310 projecting the second slice image into the curable ink resin bath 319 to create the second slice. The steps are then repeated resulting in all additional slice images being sent to the curable ink resin bath 318 to create the finished product.

Projection Micro-StereoLithography (PμSL)

Figure 4:
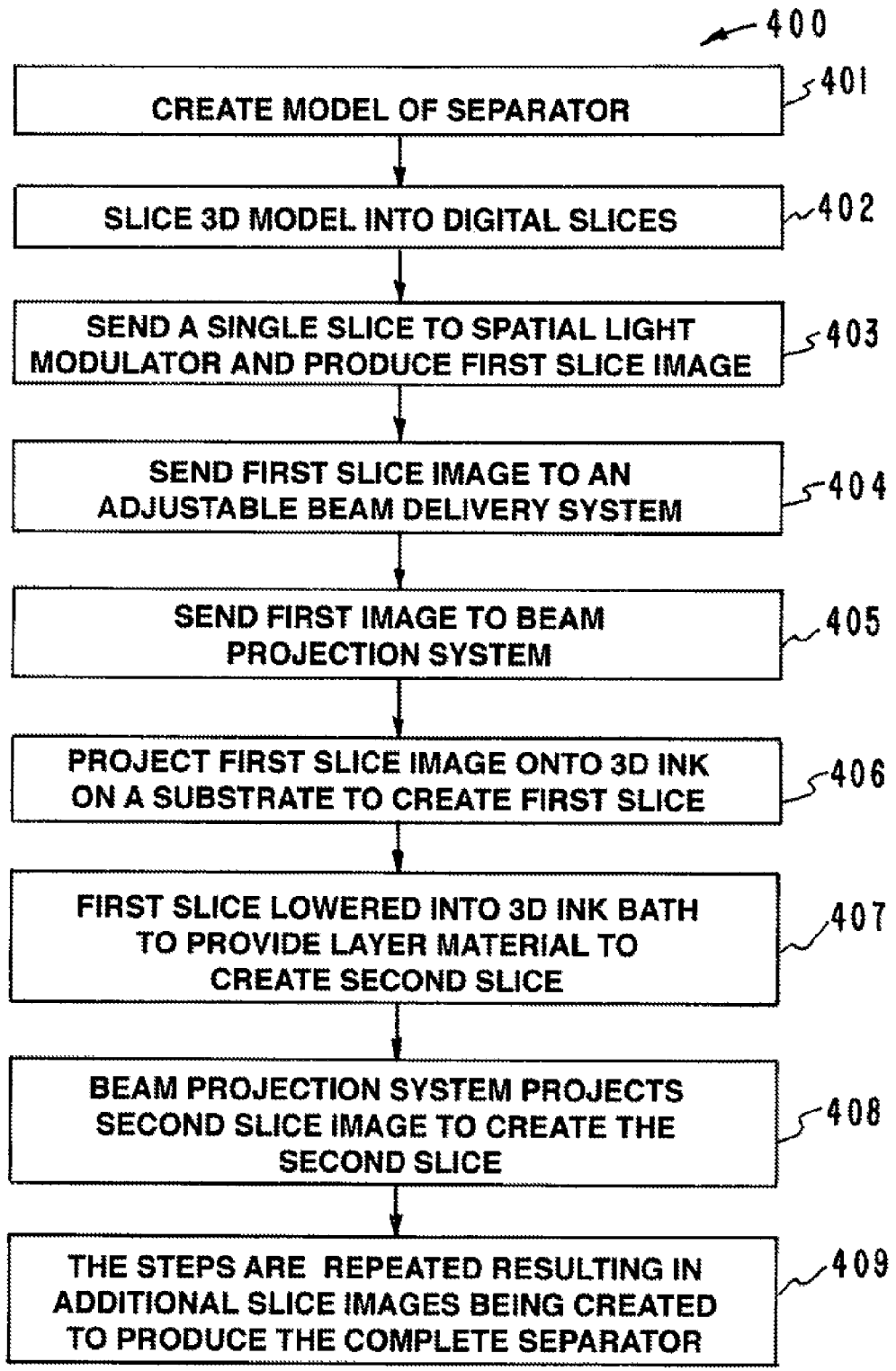
FIG. 4 is a flow chart that illustrates the embodiment of the disclosed PμSL apparatus, systems, and methods illustrated in FIG. 3.

Referring now to FIG. 4, a flow chart that illustrates the embodiment of the disclosed PμSL apparatus, systems, and methods 400. The steps in FIG. 4 are identified and described below.

Step 1—CREATE 3-D CAD MODEL (Reference Numeral 401)—In step 1 a 3D CAD model is created. The 3D CAD model is designed using computer aided design (CAD) software.

Step 2—SLICE 3D MODEL INTO SLICES (Reference Numeral 402)—In step 2 the 3-D CAD model is virtually sliced into a series of 2-dimensional data files using conventional software. The files are 2D layers, each defining a planar cross section through the product to be constructed.

Step 3—SEND A SINGLE SLICE TO A SPATIAL LIGHT MODULATOR (Reference Numeral 403)—In step 3 a single 2-D slice is sent to a spatial light modulator.

Step 4—ILLUMINATE THE FIRST SLICE AND SEND FIRST SLICE IMAGE TO AN ADJUSTABLE BEAM DELIVERY SYSTEM (Reference Numeral 404)—In step 4 a light source illuminates the SLM working surface which has reproduced the first slice and the image of the slice is sent to an adjustable beam delivery system.

Step 5—BEAM DELIVERY SYSTEM SENDS IMAGE TO BEAM PROJECTION SYSTEM (Reference Numeral 405)—In step 5 the beam delivery system sends the image to a beam projection system.

Step 6—BEAM PROJECTION SYSTEM PROJECTS FIRST SLICE IMAGE TO CREATE THE FIRST SLICE (Reference Numeral 406)—In step 6 the beam delivery system directs and projects the first slice image onto a layer of photo-curable 3D ink resin on an initial substrate. The projected image acts on the photo-curable 3D resin to create the first slice. In one embodiment the photo-curable 3D resin is an ion conductive ink made by the addition of Li Salt (Lithium Bis(trifluoromethane)sulfonimide, LiTFSI) and tetraglyme (TG) solvent to a formulation of a photo-reactive resin such as polyethyleneglycol diacrylate (PEGDA) or hexanediol diacrylate (HDDA), a photo absorber such as SUDAN-1, and a photo initiator such as Irgacure. In another embodiment the photo-curable 3D resin is an ion conductive ink made by adding methacrylpropylsulfate (MPS) salts to the above individual component that introduces tethered anions to the polymer. The inventors have found that the addition of polyethyleneglycol methacrylate (PEGMA) also helps improve ion transport through the polymer. This has the chemical structures shown below.

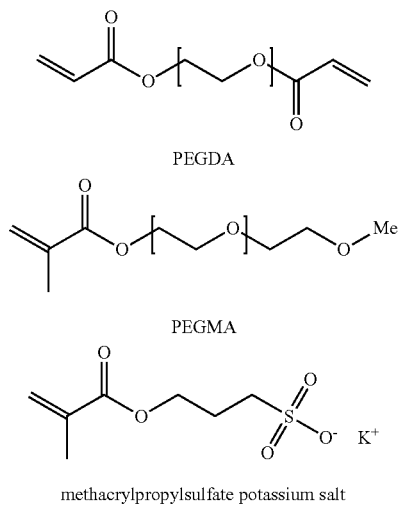

PEGDA

PEGMA methacrylpropylsulfate potassium salt

Step 7—FIRST SLICE LOWERED INTO CURABLE 3D INK RESIN BATH TO PRODUCE CURABLE INK RESIN LAYER ON FIRST SLICE—In step 7 the first slice is lowered into a curable 3D ink resin bath to produce a second curable ink 3D resin layer on the first slice.

Step 8—BEAM PROJECTION SYSTEM PROJECTS SECOND SLICE IMAGE TO CREATE THE SECOND SLICE (Reference Numeral 408)—In step 8 the beam delivery system directs and projects the second slice image onto the second layer of curable 3D ink resin on the first slice. The projected image acts on the curable 3D resin to create the second slice.

Step 9—STEPS REPEATED RESULTING IN BEAM PROJECTION SYSTEM PROJECTING SECOND SLICE IMAGE TO CURABLE INK RESIN BATH TO CREATE SECOND SLICE (Reference Numeral 409)—In step 9 the steps are repeated resulting in the beam projection system projecting the additional slice images into the curable 3D ink resin layers to create the finished product.

Figure 5:
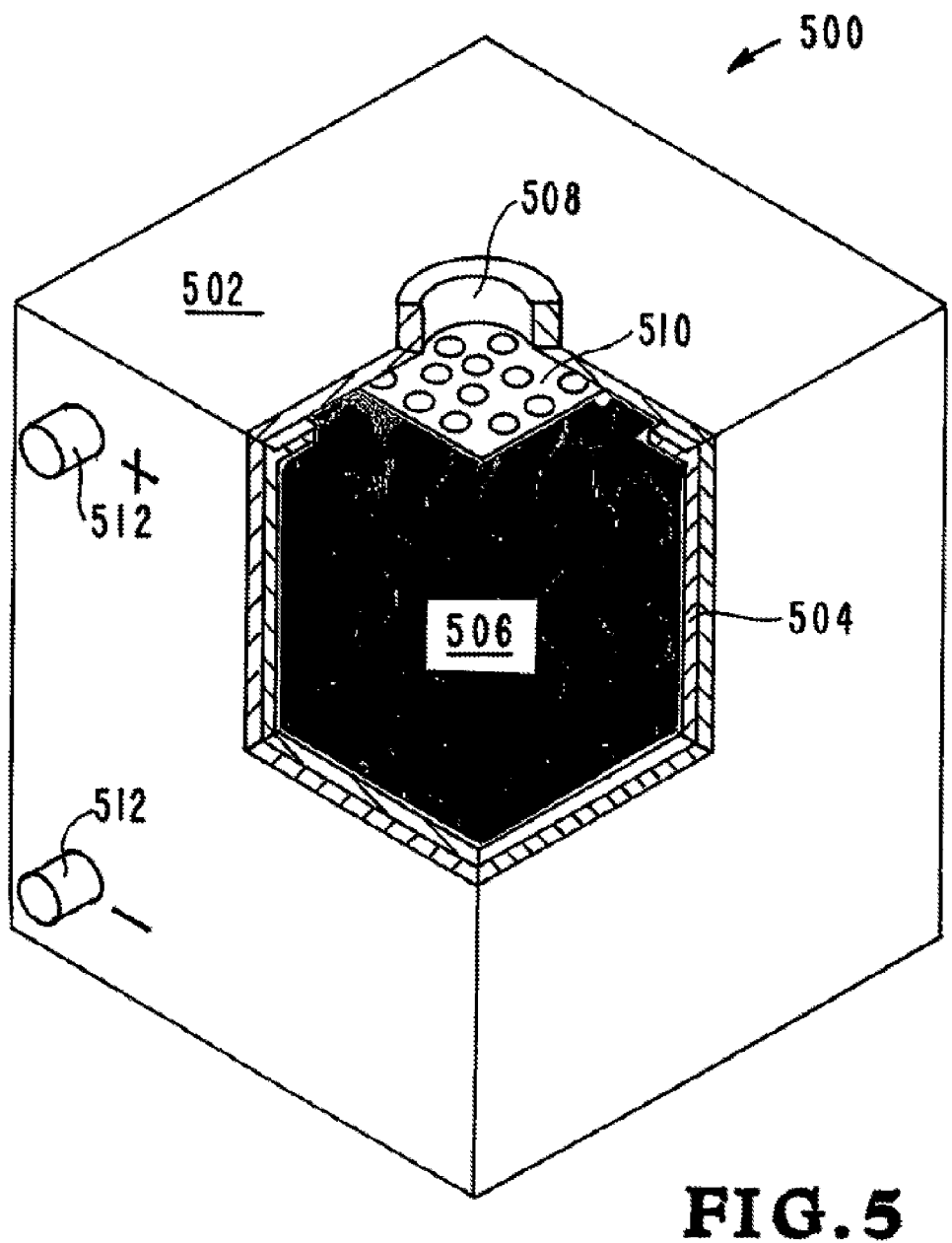
FIG. 5 is an illustration that depicts some of the steps of the inventor's apparatus, systems, and methods for producing a lithium micro-battery.

Referring now to FIG. 5, an illustration depicts some of the steps of the inventor's apparatus, systems, and methods for producing a lithium micro-battery. The illustration is designated generally by the reference numeral 500. A model of the separator made of ion conductive ink has been created using computer aided design software and the model has been used to produce a separator made of ion conductive ink.

As illustrated in FIG. 5, the sides of the separator 506 are sealed. This is accomplished by adding a material 504 that seals the sides of the separator 506. The top and bottom remain unsealed. An electrical conductive plate 510 has been positioned on the top of the separator 506. An electrode 512 is connected to the electrical conductive plate 510.

In one embodiment, the separator made from ion conductive ink with Li salt and TG added is dried using $CO_2$ solvent exchange in a critical point drying apparatus. This step introduces nano-porosity into the separator material, which facilitates ion conductivity. In the case of MPS addition, the supercritical drying step is omitted.

FIG. 5 illustrates the filling of the anode micro-channels in the separator filled with an anode material. A filling device 508 is shown for filling the anode micro-channels in the separator with an anode material. The anode material is added and fills the matrix of anode micro-channels that are interwoven throughout the separator 506 and provide an interpenetrating network of anode materials within the separator 506.

After the anode micro-channels in the separator are filled with the anode material and the cathode micro-channels in the separator are filled with the cathode material an outer casing 502 is added.

Figure 6:
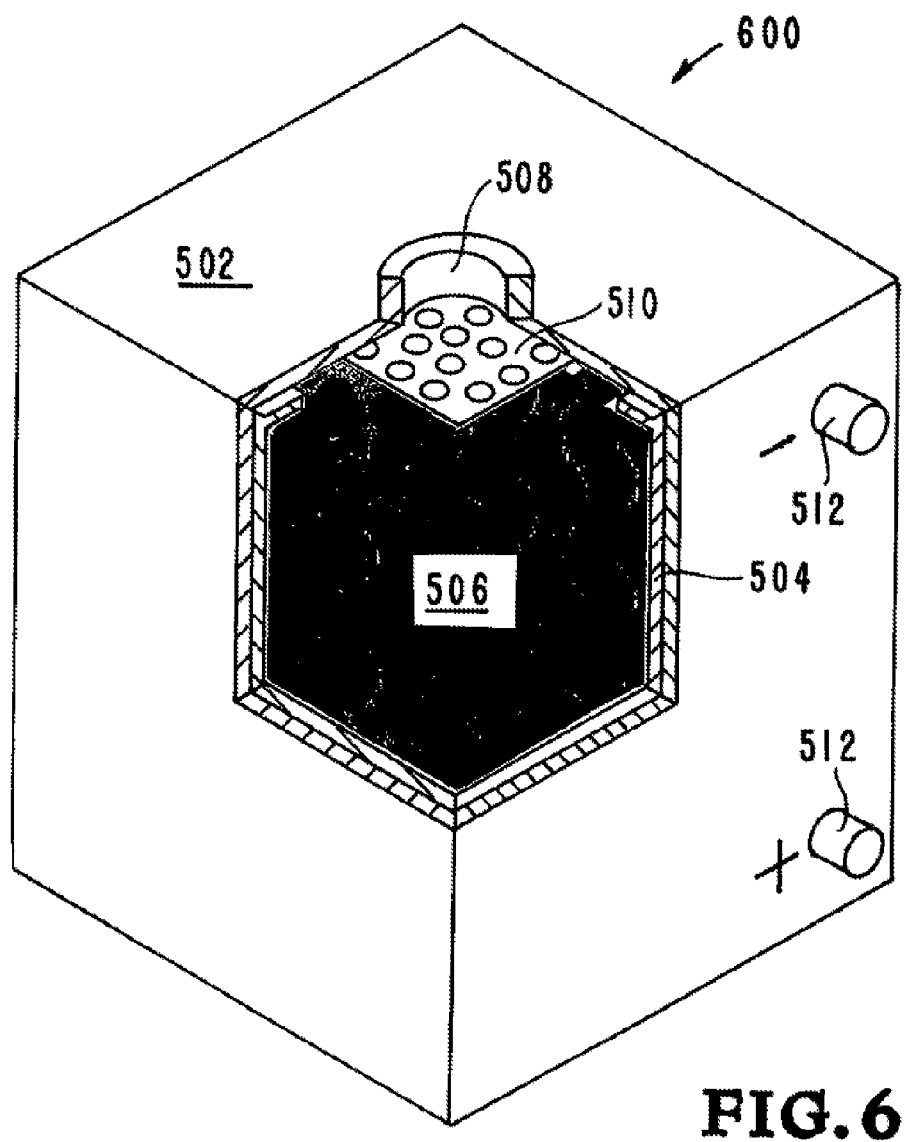
FIG. 6 is an illustration that depicts some of the steps of the inventor's apparatus, systems, and methods for producing a lithium micro-battery.

Referring now to FIG. 6, a view of the bottom of the separator 506 to provide an illustration that depicts certain steps of the inventor's apparatus, systems, and methods for producing a lithium micro-battery. The illustration is designated generally by the reference numeral 500. The model of the separator made of ion conductive ink has been created using computer aided design software and the model has been used to produce a separator 506 made of ion conductive ink.

As illustrated in FIGS. 5 and 6, the sides of the separator 506 are sealed. This is accomplished by adding a material 504 that seals the sides of the separator 506. The top and bottom of the separator 506 are unsealed until the anode material and the cathode material is added. As illustrated in FIG. 6 an electrical conductive plate 510 has been positioned on the bottom of the separator 506. An electrode 512 is connected to the electrical conductive plate 510.

FIG. 6 illustrates the filling of the cathode micro-channels in the separator with an cathode material. A filling device 508 is shown for filling the cathode micro-channels in the separator with a cathode material. The cathode material can be added as a fluid. The cathode material is added and fills the matrix of cathode micro-channels that are interwoven throughout the separator 506 and provide an interpenetrating network of cathode materials within the separator 506.

After the cathode micro-channels in the separator have been filled with the anode material and the anode micro-channels in the separator have been filled with the anode material an outer casing 502 is added.

This embodiment of the inventor's disclosed apparatus, systems, and methods 100 provide a lithium battery with a separator made of ion conductive ink. The separator made of ion conductive ink includes a network of anode micro-channels that are filled with an anode material and a network of cathode micro-channels that are filled with a cathode material. The network of anode micro-channels and the network of cathode micro-channels are interwoven and closely spaced to provide are interwoven to provide an interpenetrating network of anode and cathode materials. The matrix of anode micro-channels and the matrix of cathode micro-channels do not interconnect but instead form self-contained matrices for the anode and cathode materials.

Figure 7:
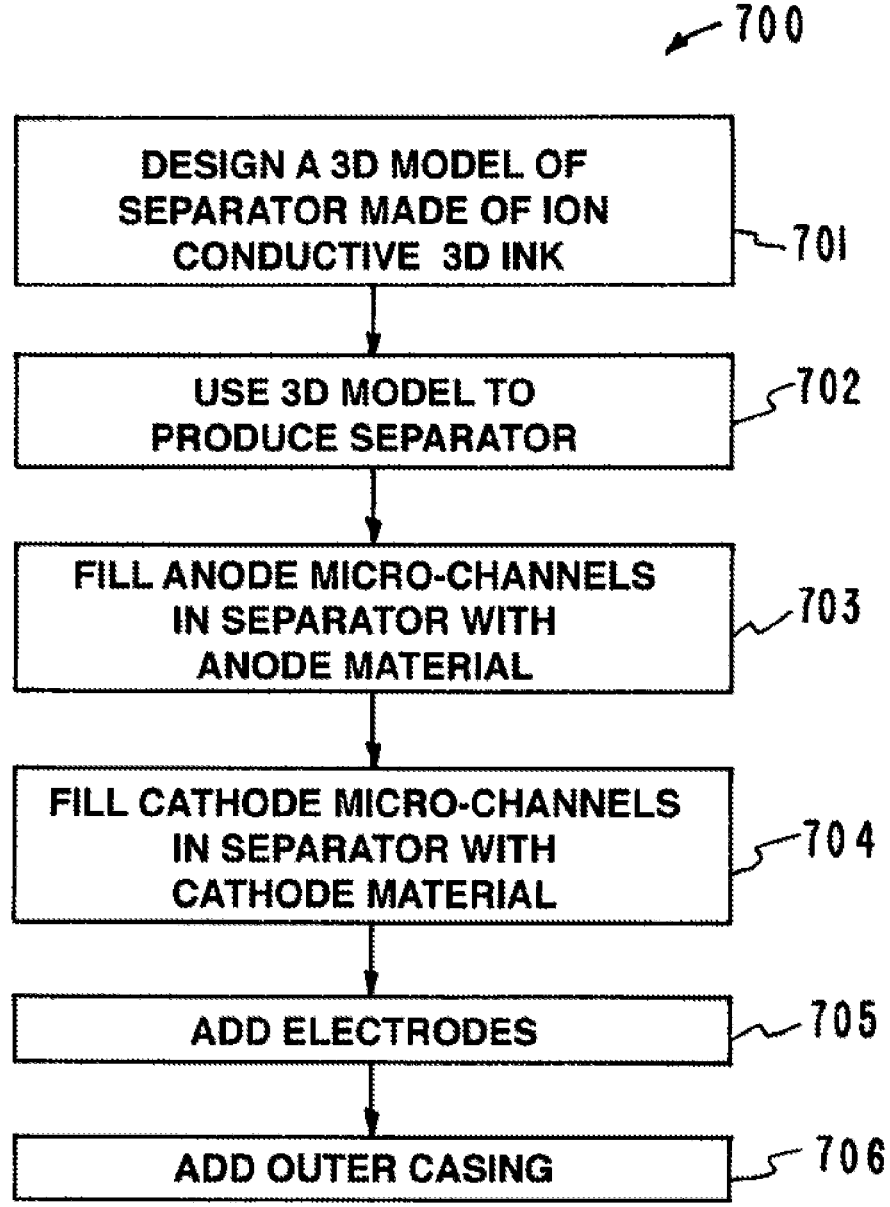
FIG. 7 is a flow chart that illustrates another embodiment of the inventor's apparatus, systems, and methods for producing a lithium micro-battery.

Referring now to FIG. 7, a flow chart illustrates one embodiment of the inventor's apparatus, systems, and methods for producing a lithium micro-battery. The flow chart is designated generally by the reference numeral 700. As illustrated in the flow chart 700, the system includes a number of steps. The steps in FIG. 7 are identified and described below.

Step 1—DESIGN A 3D MODEL OF SEPARATOR MADE OF ION CONDUCTIVE 3D INK (Reference Numeral 701)—In step 1 a model of the separator made of ion conductive ink is created. The model is designed using computer aided design (CAD) software or other systems for creating a digital model.

Step 2—USE 3D MODEL TO PRODUCE SEPARATOR (Reference Numeral 702)—In step 2 the model is used to produce a separator. In this embodiment the separator is produce by Projection Micro-StereoLithography (PµSL).

Step 3—FILL ANODE MICRO-CHANNELS IN SEPARATOR WITH 3D ANODE INK (Reference Numeral 703)—In step 3 the anode micro-channels in the separator are filled with anode ink.

Step 4—FILL CATHODE MICRO-CHANNELS IN SEPARATOR WITH 3D CATHODE INK (Reference Numeral 704)—In step 4 the cathode micro-channels in the separator are filled with cathode ink.

Step 5—ADD ELECTRODES (Reference Numeral 705)—In step 5 electrodes are added.

Step 6—ADD OUTER CASING (Reference Numeral 706)—In step 6 an outer casing is added.

This embodiment of the inventor's disclosed apparatus, systems, and methods 700 provide a lithium battery with a separator made of ion conductive ink. The separator made of ion conductive ink includes a network of anode micro-channels that are filled with an anode material and a network of cathode micro-channels that are filled with a cathode material. The network of anode micro-channels and the network of cathode micro-channels are closely spaced to provide an interpenetrating network of anode and cathode materials. The matrix of anode micro-channels and the matrix of cathode micro-channels do not interconnect but instead form self-contained matrices for the anode and cathode materials.

Figure 8:
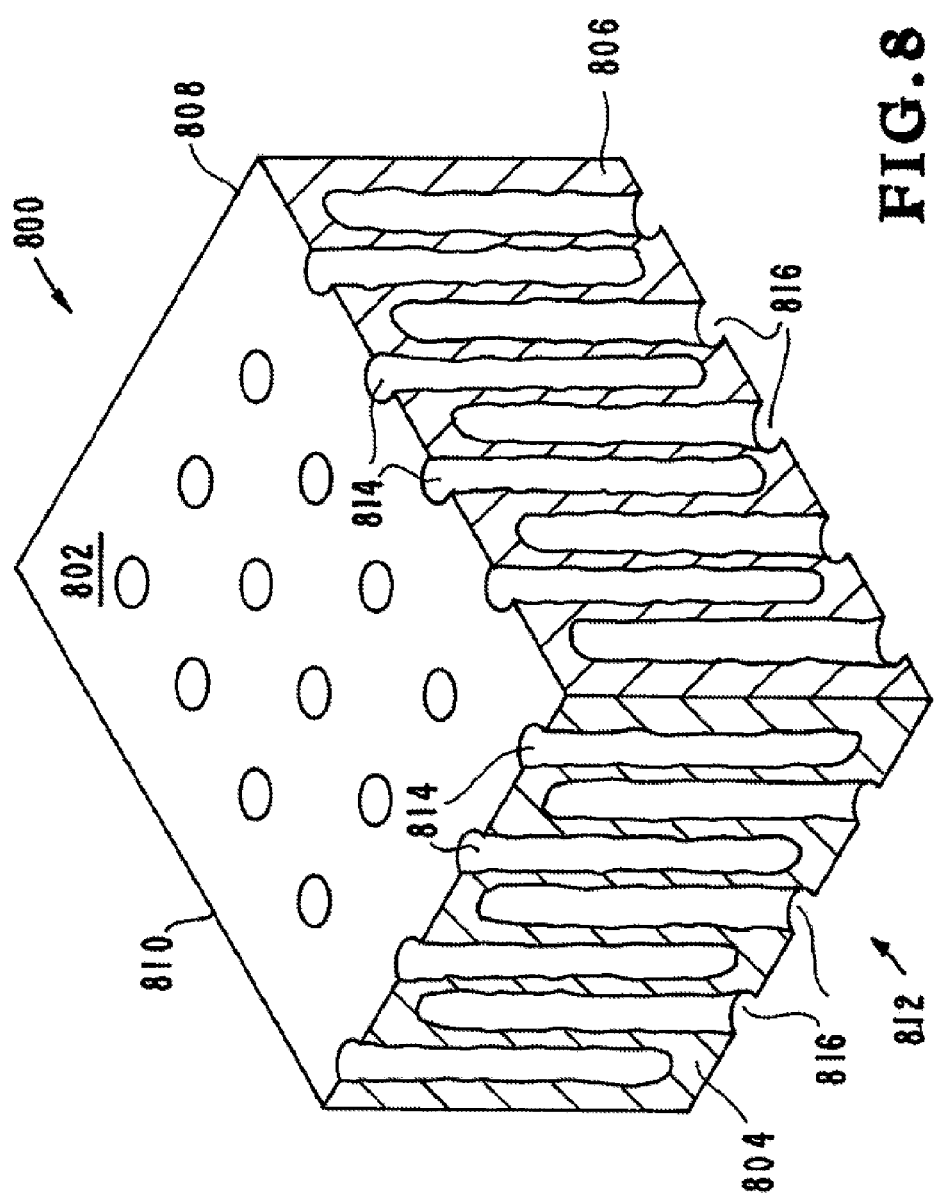
FIG. 8 illustrates another embodiment of a model of the inventor's separator.

Referring now to FIG. 8, another embodiment of a model of the inventor's separator is illustrated. The model is designated generally by the reference numeral 800. The model 800 shown in FIG. 8 illustrates a model for the construction of a micro-battery separator made of ion conductive ink. The model 800 is one embodiment of the model illustrated and describe in the flow chart of FIG. 7 under the heading "Step 1." The model 800 is designed using computer aided design (CAD) software or other systems for creating a digital model.

The model 800 will be used to build a micro-battery separator made of ion conductive ink. The micro-battery separator will have the shape of an interpenetrating, three-dimensional structure, with greater areal, volumetric, and gravimetric power density compared to conventional battery separator designs based on planar layouts (e.g., flat plates, jelly rolls, etc.), or interdigitated geometries (e.g., combs, posts). The model 800 shown in FIG. 8 has a matrix of anode micro-channels and a matrix of cathode micro-channels that provide an interpenetrating network of anode and cathode materials. The model 800 provides high surface areas and small transport distances while maximizing the amount of active anode and cathode materials.

The three dimensional model 800 has a top surface 802, four side surfaces 804, 806, 808, and 812 of which side surfaces 804 and 806 can be seen in FIG. 8, and a bottom surface that cannot be seen in FIG. 8 but is designated by the arrow 812. Top openings 814 are illustrated in the model 800. The top openings 814 represent openings for a matrix of anode micro-channels.

The anode micro-channels 816 are illustrated in the model 800. The anode micro-channels 816 have bottom openings represent openings for the matrix of anode micro-channels. The matrix of cathode micro-channels 814 and the matrix of anode micro-channels 816 provide an interpenetrating network of anode and cathode materials. The matrix of cathode micro-channels 816 and the matrix of anode micro-channels 814 do not interconnect but instead form self-contained matrices for the anode and cathode materials.

The matrix of anode micro-channels 814 extend from the top surface 802 into the body of the model 800 but do not extend to the bottom surface 812. The matrix of cathode micro-channels 816 extend from the bottom surface 802 into the body of the model 800 but do not extend to the top surface 802.

Figure 9:
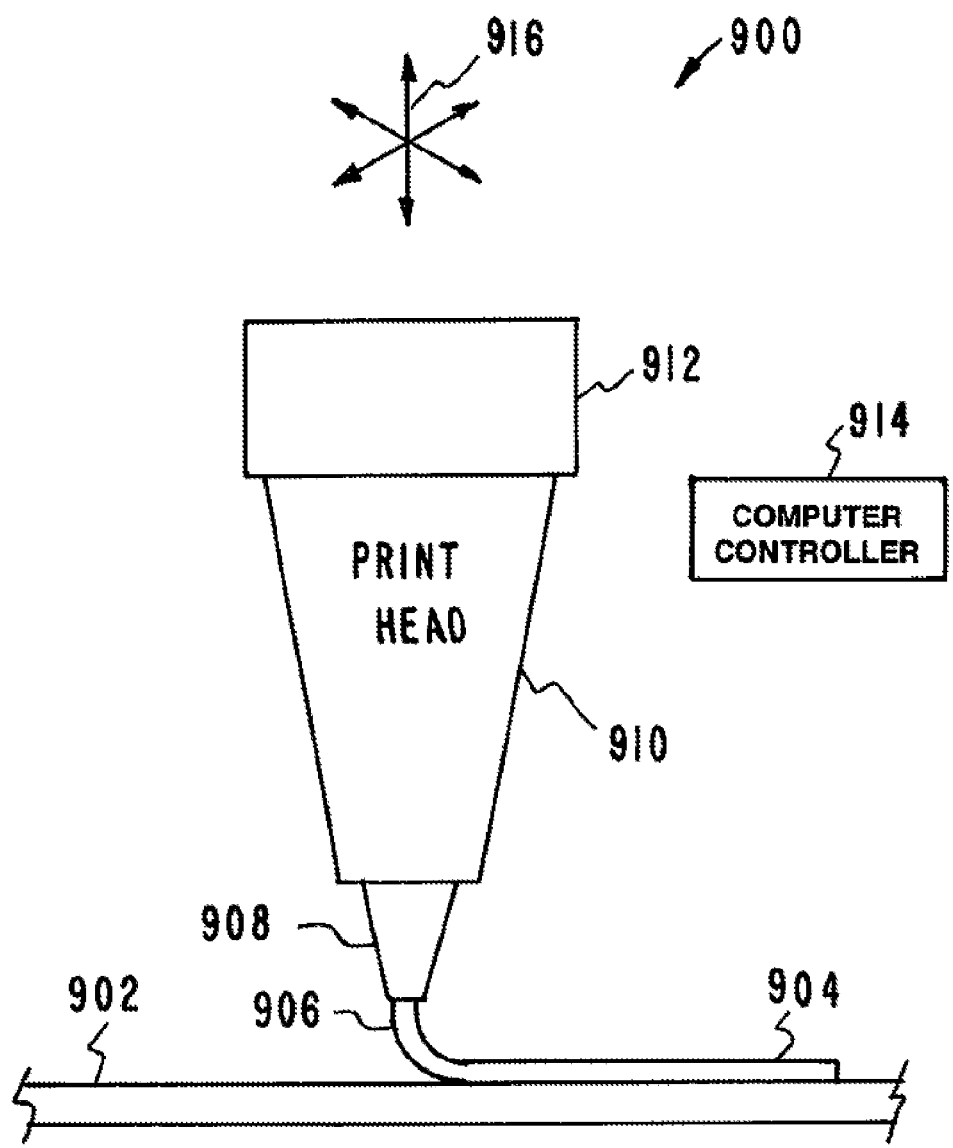
FIG. 9 illustrates another example of an embodiment of the inventor's apparatus, systems, and methods.

Referring now to FIG. 9, another example of an embodiment of the inventor's apparatus, systems, and methods is illustrated. The embodiment is designated generally by the reference numeral 900. FIG. 9 is a cut away view of the print head 910 showing extruded ion conductive ink 904. The print head nozzle 908 is shown extruding 906 the ion conductive ink 904 onto the substrate 902.

A reservoir 912 in the print head 910 holds the ion conductive ink. The ion conductive ink is pressure actuated to drive the ink 904 from the nozzle 908. The ion conductive ink system 912 has a tailored ion conductive ink 904. In one embodiment the ion conductive ink 904 is made by the addition of Li Salt (Lithium Bis(trifluoromethane)sulfonimide, LiTFSI) and tetraglyme (TG) solvent. In another embodiment the ion conductive ink 904 is made by adding methacrylpropylsulfate (MPS) salts to PEGDA that introduces dangling anions to the polymer. The inventors have found that the addition of PEGMA also helps improve ion transport through the polymer. This has the chemical structures shown below.

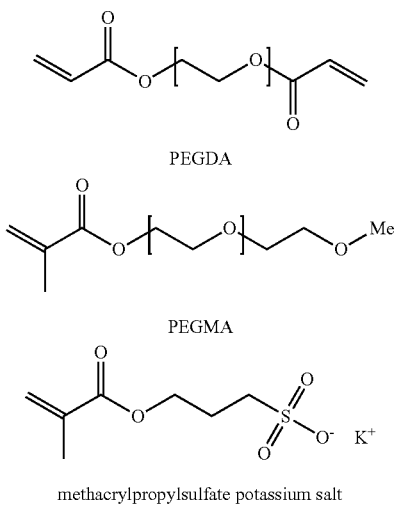

PEGDA

PEGMA methacrylpropylsulfate potassium salt

Figure 10:
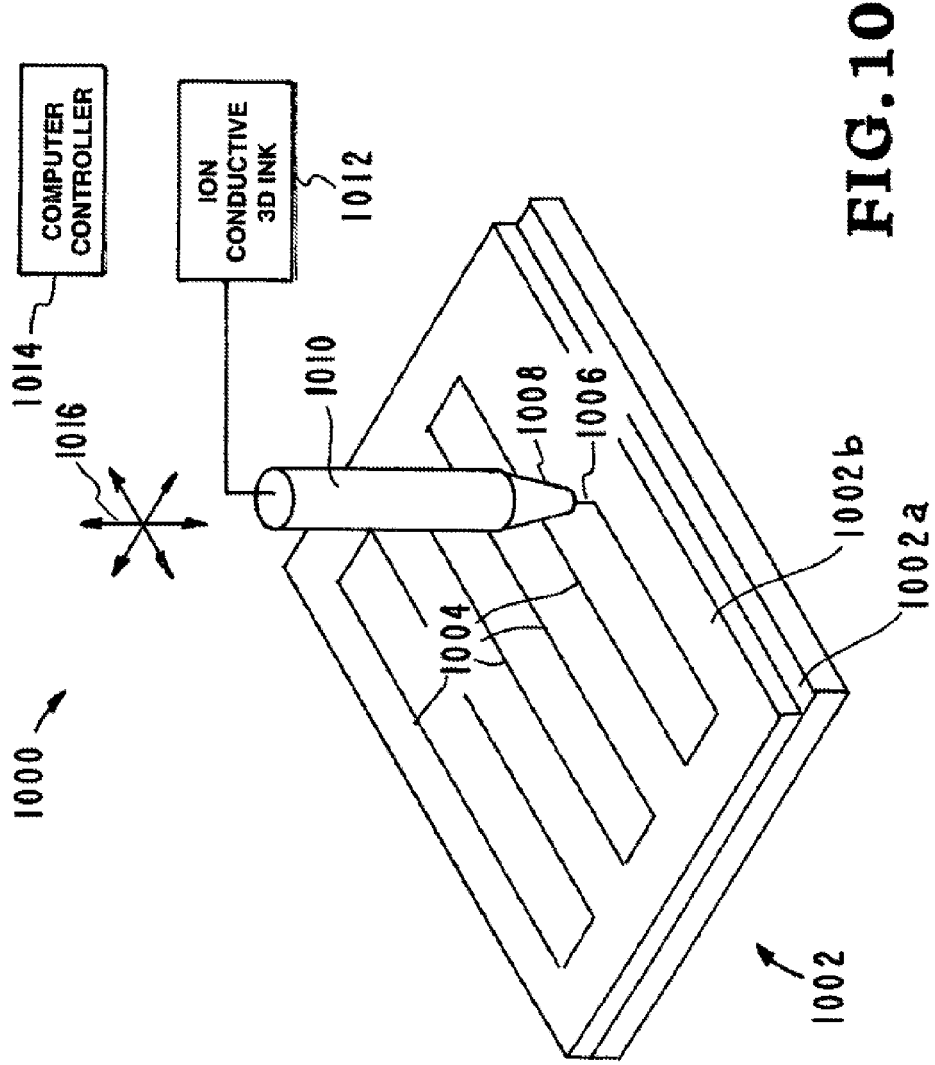
FIG. 10 illustrates yet another example of an embodiment of the inventor's apparatus, systems, and methods.

Referring now to FIG. 10, another embodiment of the inventor's apparatus, systems, and methods is shown. This embodiment is designated generally by the reference numeral 1000. The embodiment 1000 provides apparatus, systems, and methods for 3D printing and otherwise additively manufacturing processes used to make a three-dimensional object. Additive processes are used wherein successive layers of material are laid down under computer control. The three-dimensional objects can be of almost any shape or geometry and can be produced from a model or other electronic data source.

As illustrated in FIG. 10, extruded material 1006 composed ion conductive ink is deposited on a surface 1002a to be printed by print head 1010. The print head 1010 has a nozzle 1008 for extruding the ion conductive ink 1006 onto the surface 1002a. Movement of the print head 1010 is controlled by computer controller 1014 which provides freedom of movement along all axes as indicated by the arrows 1016. The product, in this case a battery separator, to be created by the system 1000 is fed to the computer controller 1014 with the widely used numerical control programming language G-Code. The computer controller 1014 uses the instructions to move the print head 1010 through a series of moments along the surface 1002a forming the product to be created by the system 1000.

The print head 1010 receives the ion conductive ink 1012 that is moved through the print head 1010 and emerges as the extruded material 1006. A tailored ion conductive ink feed system 1012 is connected to the print head 1010. The tailored ion conductive ink feed 1012 produce the extruded material 1006. Movement the print head 1010 on the surface 1002a forms a pattern 1004 providing the battery separator product to be created by the system 1000.

Figure 11:
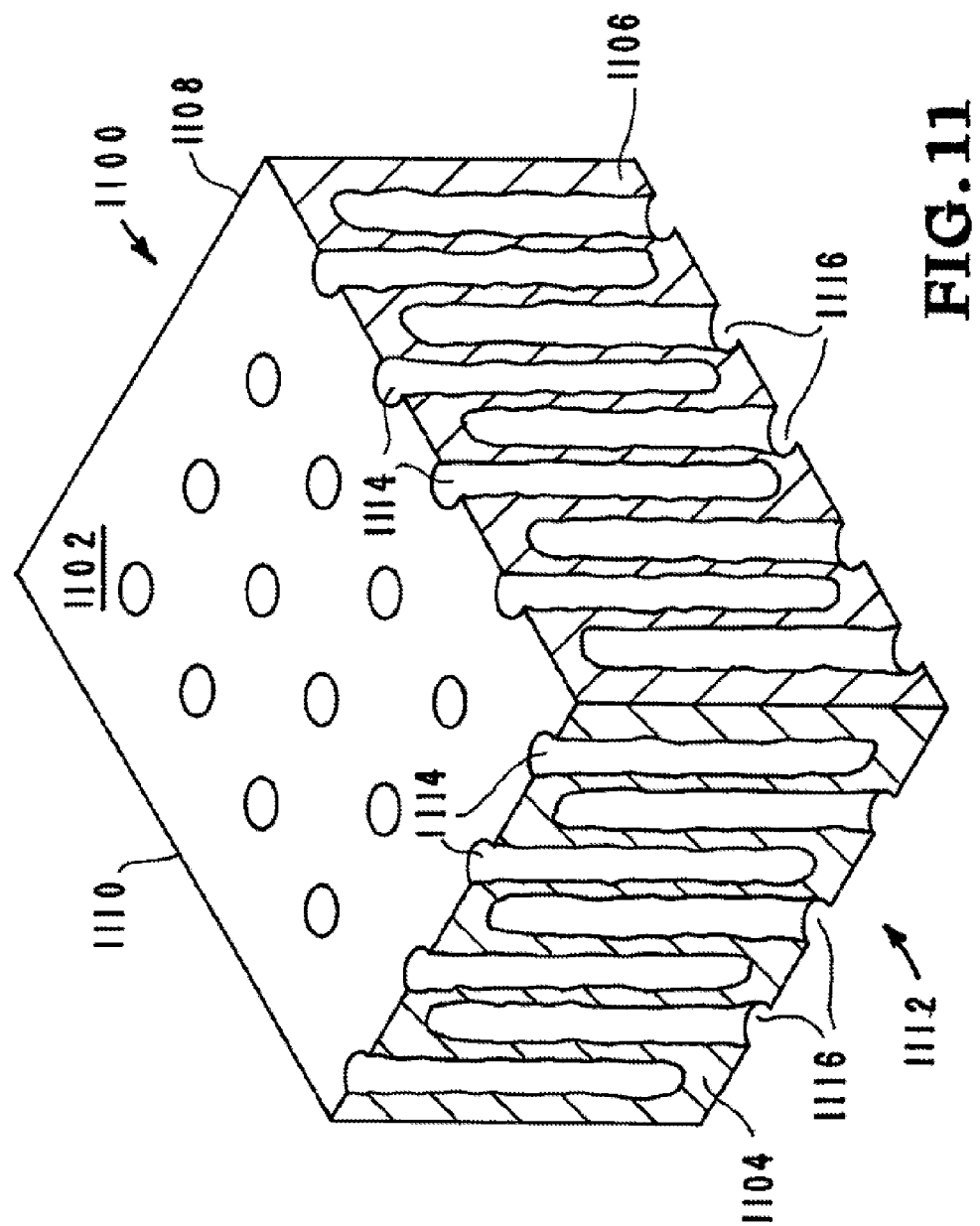
FIG. 11 illustrates another embodiment of a separator.

Referring now to FIG. 11, another embodiment of a separator is illustrated. The separator is designated generally by the reference numeral 1100. The separator 1100 shown in FIG. 11 illustrates a separator for a micro-battery. The separator 1100 is one embodiment of the separator illustrated and describe in the flow chart of FIG. 7 under the heading "Step 1." The separator 1100 is designed using computer aided design (CAD) software or other systems for creating a digital separator.

The separator 1100 will be used to build a micro-battery wherein the separator is made of ion conductive ink. The micro-battery separator will have the shape of an interpenetrating, three-dimensional structure, with greater areal, volumetric, and gravimetric power density compared to conventional battery separator designs based on planar layouts (e.g., flat plates, jelly rolls, etc.), or interdigitated geometries (e.g., combs, posts). The separator 1100 shown in FIG. 11 has a matrix of anode micro-channels and a matrix of anode micro-channels that provide an interpenetrating network of anode and cathode materials. The separator 1100 provides high surface areas and small transport distances while maximizing the amount of active anode and cathode materials.

The three dimensional separator 1100 has a top surface 1102, four side surfaces 1104, 1106, 1108, and 1110 of which side surfaces 1104 and 1106 can be seen in FIG. 11, and a bottom surface that cannot be seen in FIG. 11 but is designated by the arrow 1112. Top openings 1114 are illustrated in the separator 1100. The top openings 1114 represent openings for a matrix of anode micro-channels.

The anode micro-channels 1116 are illustrated in the separator 1100. The anode micro-channels 1116 have bottom openings represent openings for a matrix of cathode micro-channels. The matrix of cathode micro-channels 1114 and the matrix of anode micro-channels 1116 provide an interpenetrating network of anode and cathode materials. The matrix of cathode micro-channels 1116 and the matrix of anode micro-channels 1114 do not interconnect but instead form self-contained matrices for the anode and cathode materials.

The matrix of anode micro-channels 1114 extend from the top surface 1102 into the body of the separator 1100 but do not extend to the bottom surface 1112. The matrix of cathode micro-channels 1116 extend from the bottom surface 1112 into the body of the separator 1100 but do not extend to the top surface 1102.

The inventor's apparatus, systems, and methods provide a micro-battery and a system for producing a micro-battery by additive manufacturing using ion conductive ink. A separator made of ion conductive ink is produced by additive manufacturing. The micro-battery is produced with the separator located between the battery's anode and cathode. The separator functions to keep the anode and cathode apart and to allow the transport of ions to produce an operative micro-battery. In one embodiment the separator is made ion conductive ink that provides greater mechanical, thermal, and electrochemical stability over prior art liquid electrolytes. In one embodiment the ion conductive ink is made by the addition of Li Salt (Lithium Bis(trifluoromethane)sulfonimide, LiTFSI) and tetraglyme (TG) solvent. In another embodiment the ion conductive ink is made by adding methacrylpropylsulfate (MPS) salts to PEGDA that introduces dangling anions to the polymer.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of making a micro-battery, comprising the steps of:
creating a three dimensional model of a micro-battery separator, wherein said three dimensional model of a micro-battery separator has sides, a top, and a bottom, and comprises anode micro-channels extending from said top to said sides and cathode micro-channels extended from said bottom to said sides;
using said three dimensional model of a micro-battery separator to produce a micro-battery separator by additive manufacturing, wherein said additive manufacturing uses ion conductive ink to produce said micro-battery separator, and wherein said micro-battery separator has sides, a top, and a bottom, and comprises anode micro-channels extending from said top to said sides and cathode micro-channels extended from said bottom to said sides;
creating a seal for the micro-battery by adding a material that seals said sides of said micro-battery separator leaving said top and said bottom unsealed;
positioning a top electrical conductive plate on said top of said micro-battery separator;
adding a top electrode connected to said top electrical conductive plate;
positioning a bottom electrical conductive plate on said bottom of said micro-battery separator;
adding a bottom electrode connected to said bottom electrical conductive plate;
filling said anode micro-channels in said micro-battery separator with anode material;
filling said cathode micro-channels in said micro-battery separator with cathode material; and
adding an outer casing.

2. The method of making a micro-battery of claim 1, wherein said additive manufacturing is projection micro-stereolithography.

3. The method of making a micro-battery of claim 1, wherein said additive manufacturing is 3D printing.

4. The method of making a micro-battery of claim 1, wherein said ion conductive ink is Lithium Bis(trifluoromethane)sulfonimide, LiTFSI) and tetraglyme solvent.

5. The method of making a micro-battery of claim 1, wherein said ion conductive ink is methacrylpropylsulfate (MPS) salts and PEGDA.

6. The method of making a micro-battery of claim 1, wherein said ion conductive ink is methacrylpropylsulfate salts and PEGDA/PEGMA having a

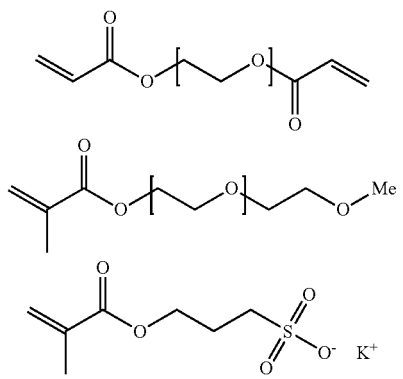

chemical structure.

7. The method of making a micro-battery of claim 1, wherein said micro-battery separator has a matrix of anode micro-channels and a matrix of cathode micro-channels wherein said matrix of anode micro-channels and said matrix of cathode micro-channels do not interconnect and form self-contained matrices for said anode material in said anode micro-channels and said cathode material in said cathode micro-channels.

8. The method of making a micro-battery of claim 7, wherein said matrix of anode micro-channels and said matrix of cathode micro-channels are interwoven to provide an interpenetrating network.

* * * * *